(No Model.)
P. AMBJORN COMTE DE SPARRE.
WHEEL FOR CYCLES.
No. 540,478. Patented June 4, 1895.
FIG. 1.
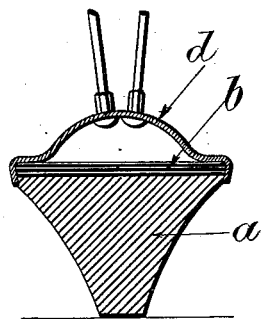
FIG. 2.
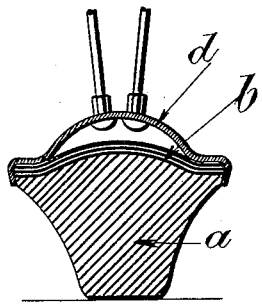
FIG. 3.
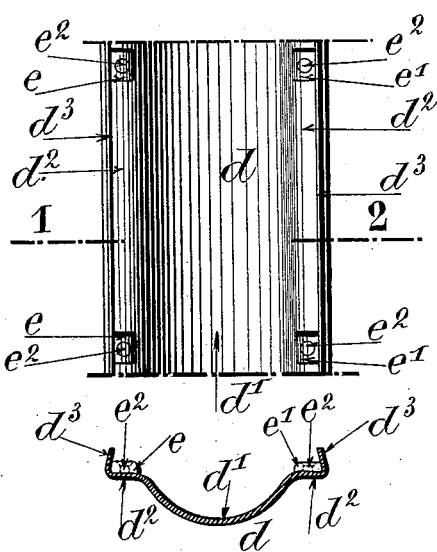
FIG. 6.
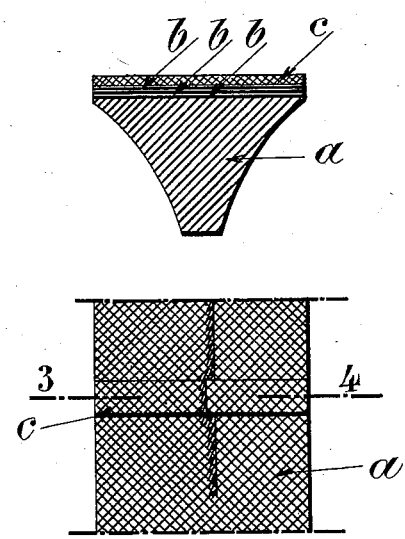
FIG. 4.
FIG. 5.
Witnesses:
W. E. Bowen
H. C. Pinckney
Inventor:
Pierre Ambjorn Comte de Sparre,
By J. E. M. Bowen
atty.

UNITED STATES PATENT OFFICE.

PIERRE AMBJORN COMTE DE SPARRE, OF PARIS, FRANCE.

WHEEL FOR CYCLES.

SPECIFICATION forming part of Letters Patent No. 540,478, dated June 4, 1895.

Application filed March 21, 1895. Serial No. 542,576. (No model.) Patented in France August 25, 1894, No. 240,975.

*To all whom it may concern:*

Be it known that I, PIERRE AMBJORN COMTE DE SPARRE, civil engineer, a subject of the King of Sweden and Norway, and a resident of 16 Place de la Madeleine, Paris, in the Republic of France, have invented new and useful Improvements in Wheels for Cycles, (for which I have obtained Letters Patent in France for fifteen years, No. 240,975, dated August 25, 1894,) of which the following is a specification.

My invention relates to an elastic wheel for velocipedes and other light vehicles, the distinguishing features of which are the peculiar construction of its rim and of its elastic tire, through the combination of which I obtain a new technical effect.

In the accompanying drawings, which form a part of this specification, and in which like parts are indicated by like letters of reference in the several views, Figure 1 represents a transverse section of the rim and of the tire united in accordance with my invention. Fig. 2 is a corresponding section, showing the tire in the shape which it may assume while rolling over the ground. Fig. 3 is a ground plan of a detail of the wheel-rim, and Fig. 4 a section along line 1 2 in Fig. 3. Fig. 5 is a ground plan of the elastic tire, and Fig. 6 a section along line 3 4 in Fig. 5.

The tire $a$ is made of rubber or other similar material, and its transverse section is made trapezoidal. The two sides which are not parallel are made concave curving slightly. Upon the inner surface of the tire $a$ one or more layers or thicknesses of strong cloth $b$, $b$, $b$, are applied. In the drawings three such thicknesses are shown. At intervals, throughout its length, the inner wall of the tire $a$ is provided with cross grooves $c$ of suitable dimensions.

The purpose of the strong cloth is to prevent the elongation of the elastic material when the tire is flattened upon the ground, during its travel, and which tends to cause the wearing away of the tire. The strong cloth however is also intended to contribute to the production of a novel result which is more fully referred to hereinafter.

The rim $d$ which is intended to receive the elastic tire has the pecular cross-section indicated in the drawings, comprising an inner portion, curving so as to more or less approximate part of a circular arch, to which are joined to the right and left two flat portions $d^2$, $d^2$, upon which the outer edges of tire $a$ rest, and two flanges $d^3$, $d^3$, designed to prevent the lateral displacement of the tire. Corresponding with the grooves $c$ in tire $a$, projections $e$, $e'$, are provided upon portions $d^2$, $d^2$ of the wheel rim, which projections engage with and are so confined in said grooves $c$ when the tire is stretched over the rim, as to resist longitudinal or circumferential displacement of the tire upon the rim. The projections $e$, $e'$, are only provided on the flat portions $d^2$, $d^2$, and consist of small prismatic pieces attached to the rim, to which they are secured by rivets $e^2$. The prismatic pieces $d^2$ may form the head of the rivets $e^2$. I would however state that without departing from the principle of my invention, I may also, for the purpose of preventing longitudinal displacement of the tire along the rim, provide the elastic tire with transverse projections and the rim with corresponding depressions.

By combining such tire with such a rim I obtain the following novel results: As indicated in Fig. 2, when the tire changes its form while traveling upon solid ground and under the weight which it carries, its base or inner surface will bend while entering only partly into the interior groove $d'$ of the rim. However even under very heavy loads, the tire will never touch the bottom of the groove $d'$, on account of the presence of the strong cloth $b$, which permits the rubber to undergo certain changes in form under a load, or when obstacles are met with in the road, and which being itself non-elastic prevents any shocks from being transmitted radially upon the rim, quite neutralizing such shocks in a certain sense, distributing the same into an infinite number of strains of which only a very small portion is directed radially, the remaining strains producing a displacement resembling the rays from a star, around the point where the compression or shock is applied.

Finally, I would remark that while the forms which I have given to the rim and to the tire, as shown in the drawings, appear to me to be the most suitable, I may vary the same more or less providing the results obtained from the employment of such forms be the same.

Having thus described my invention, what I claim is—

The combination with a tire $a$ of a trapezoidal or equivalent cross-section, the greater base or interior wall of which is covered by one or more thicknesses of strong cloth $b$, of a corresponding rim $d$, the cross-section of which shows a concave middle portion $d$, bordered by two flat portions $d^2$ upon which rests the tire, and two lateral flanges $d^3$, substantially as specified.

In testimony that I claim the foregoing as my invention I have signed my name, in presence of two witnesses, this 26th day of February, A. D. 1895.

PIERRE AMBJORN COMTE DE SPARRE.

Witnesses:
 GEORGES LAWREND,
 EUÈGNE WATTIER.